United States Patent [19]
Nakamura et al.

[11] Patent Number: 5,115,783
[45] Date of Patent: May 26, 1992

[54] METHOD FOR VARYING THE FLOW RATE OF FUEL IN A DISTRIBUTOR-TYPE ELECTRONIC CONTROL FUEL-INJECTION PUMP

[75] Inventors: Hisashi Nakamura; Kenichi Kubo; Takashi Ohishi; Hosokawa Hitoshi, all of Higashi-Matsuyama, Japan

[73] Assignee: Zexel Corporation, Tokyo, Japan

[21] Appl. No.: 623,655

[22] Filed: Dec. 19, 1990

[51] Int. Cl.$^5$ .............................. F02M 39/00
[52] U.S. Cl. ...................... 123/496; 123/500; 123/506
[58] Field of Search ............ 123/496, 449, 506, 500, 123/501, 357; 417/490

[56] References Cited

U.S. PATENT DOCUMENTS

| | | | |
|---|---|---|---|
| 4,029,071 | 6/1977 | Saito | 123/496 |
| 4,385,614 | 5/1983 | Eheim | 123/506 |
| 4,714,068 | 12/1987 | Nagase | 123/506 |
| 4,870,936 | 10/1989 | Eheim | 123/449 |
| 4,962,743 | 10/1990 | Perr | 123/501 |

FOREIGN PATENT DOCUMENTS

| | | | |
|---|---|---|---|
| 0132038 | 7/1985 | Japan | 123/496 |
| 0229930 | 10/1986 | Japan | 123/496 |
| 0232344 | 10/1986 | Japan | 123/496 |
| 0275542 | 12/1986 | Japan | 123/496 |
| 0055455 | 3/1987 | Japan | 123/496 |
| 0201330 | 8/1988 | Japan | 123/496 |

Primary Examiner—Carl Stuart Miller
Attorney, Agent, or Firm—Nields & Lemack

[57] ABSTRACT

A method for varying the flow rate of fuel in a distributor-type electronic control fuel-injection pump. A single solenoid valve is used to control the timing of initiating and terminating fuel delivery. A cam is operated under four different modes, a low idle or a low speed/low load zone, a middle load zone, a high load zone, and a governing or high idle zone in that order as the cam is rotated. At the governing or high idle zone, the solenoid valve is closed before the cam is lifted and is opened to control fuel delivery when it is terminated.

7 Claims, 5 Drawing Sheets

Fig. 1-A
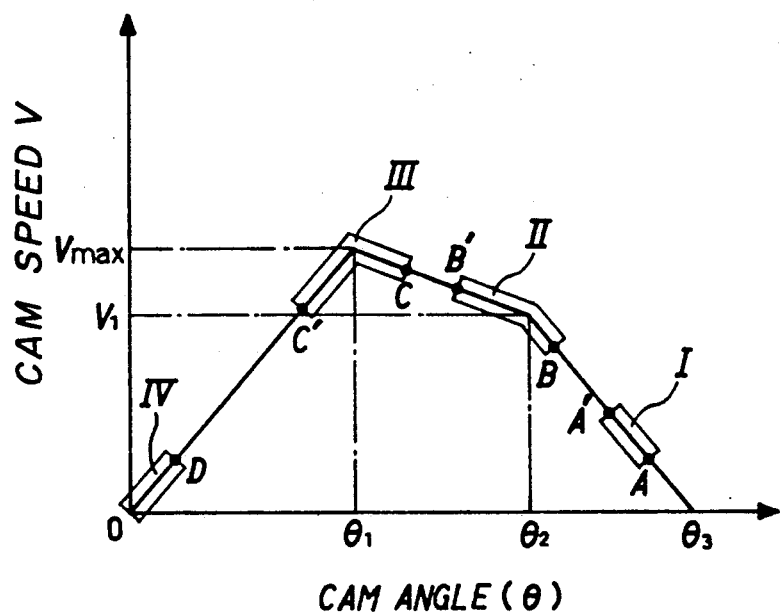
Fig. 1-B
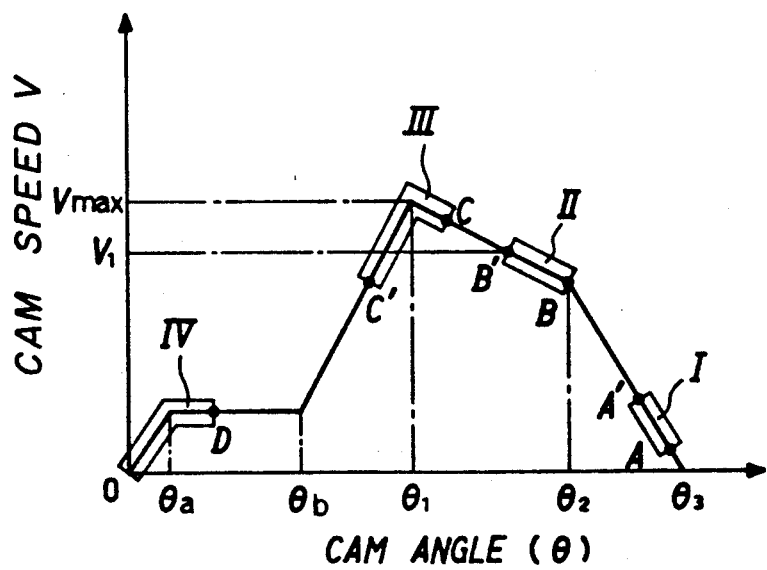

Fig. 2-A
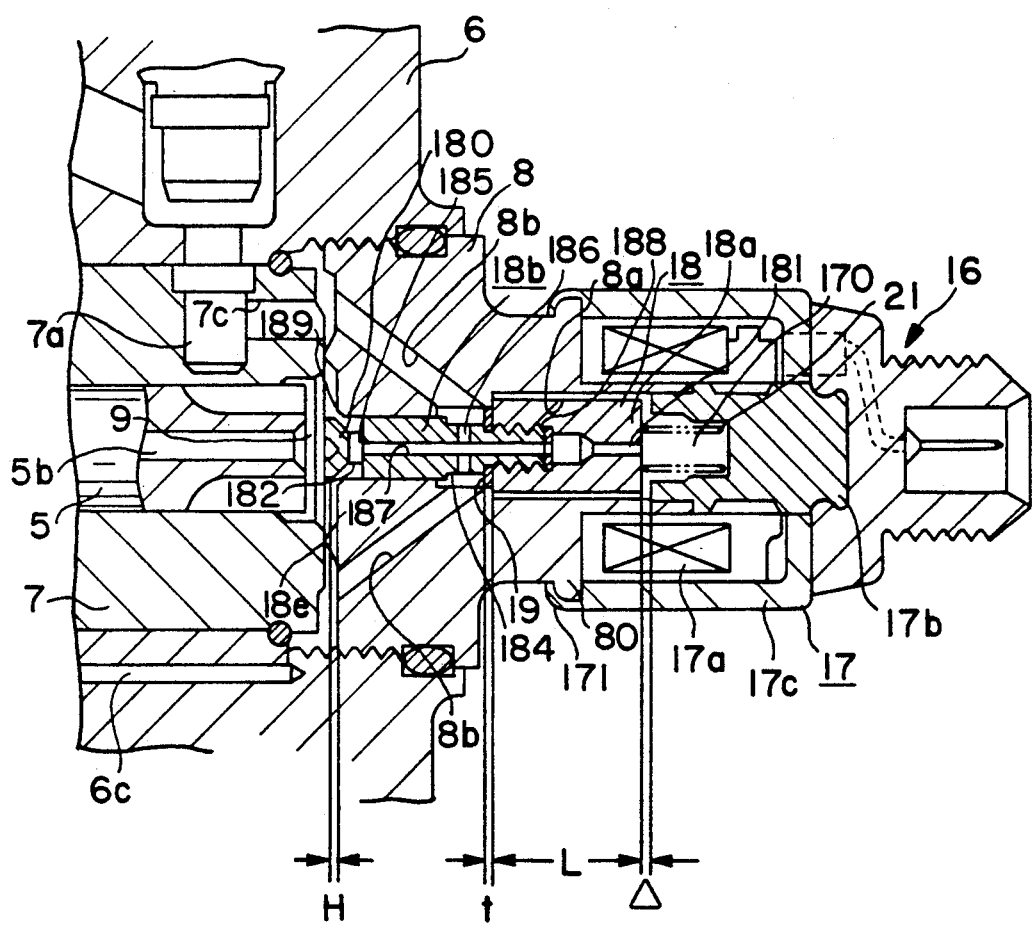

Fig. 4-A
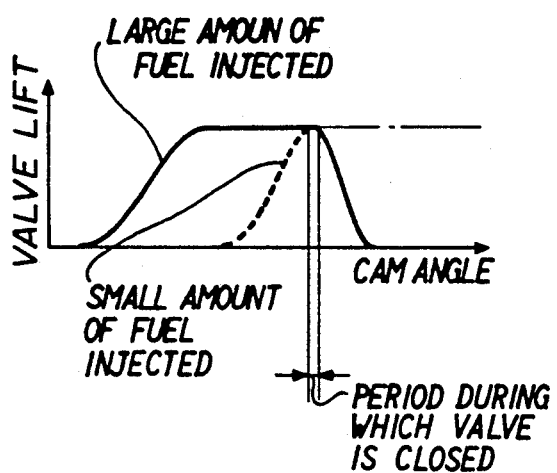
Fig. 4-B
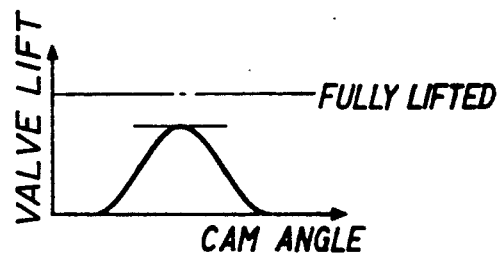
Fig. 5
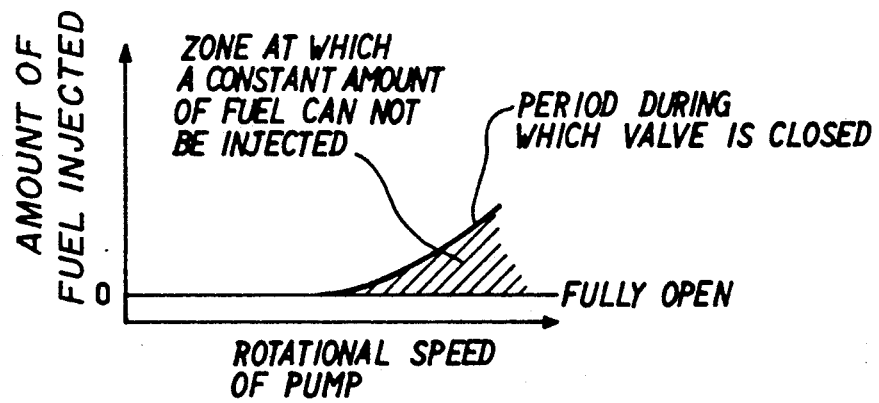

METHOD FOR VARYING THE FLOW RATE OF FUEL IN A DISTRIBUTOR-TYPE ELECTRONIC CONTROL FUEL-INJECTION PUMP

TECHNICAL FIELD

The present invention relates to a method for varying the flow rate of fuel in a distributor-type electronic control fuel-injection pump.

BACKGROUND ART

A distributor-type electronic control fuel-injection pump is known as one type of fuel-injection pumps for use in a diesel engine. Japanese laid-open utility model publication No. 123273/1986 discloses a distributor-type fuel-injection pump wherein a distributor head includes a spill passage to provide a communication between a high pressure chamber, the volume of which is variable in response to reciprocating motion of a plunger, and a low pressure chamber (cam chamber). A solenoid valve is incorporated into the spill passage and is opened and closed to control the timing of initiating and stopping fuel delivery and thus, the amount and timing of fuel to be injected.

In such a prior art pump, a cam is used to reciprocate the plunger, and a change in the speed of the cam results in a corresponding change in the timing of fuel injection and thus, the amount of fuel injected. To this end, the cam is rotated at a constant speed so as to controllably initiate and stop fuel injection. However, if the cam is constantly rotated at a high speed, then engine output increases when an engine is ooperated at high speed and high load, but noise increases during low speed and low load operation. On the other hand, if the cam is rotated at a low speed, then the sound of knock decreases during low speed and low load operation, but the engine output decreases during high speed and high load operation.

To overcome this, Japanese laid-open patent publication No. 201330/1988 proposes a distributor-type electronic control fuel-injection pump wherein a cam is used to reciprocatingly move a plunger and configured to provide a high-speed portion by which the speed of the cam is kept constant during high speed operation, and a low-speed portion by which the speed of the cam is kept constant during low speed operation. This controls the amount of fuel to be injected.

When a normally open solenoid valve is incorporated into the spill passage to control the amount of fuel to be injected, the solenoid is energized to lift the valve so as to close the spill port during a discharge cycle where the plunger is lifted. This results in an increase in the pressure of fuel in the high pressure chamber, and fuel delivery is initiated. When the solenoid is deenergized, the valve is operable to open the spill port. This allows the fuel to flow from the high pressure chamber to the lower pressure chamber so as to stop fuel delivery.

During such an operation, the solenoid is operable in a rapid fashion since it is electrically actuated. On the other hand, those valves (for example, a poppet valve and a needle valve) that are actuated by an armature is mechanically slidably moved and therefore, relatively slowly operated. A delay in the response is concerned with the amount of fuel injected. Valve lift characteristics vary with the amount of fuel injected as shown in FIG. 4A. Such characteristics need not be taken for consideration with a normal injection system used in the prior art. With a high speed injection system or a high speed-direct injection system, it is inevitable, however, that a constant amount of fuel can not be injected at a high idle zone or at high speed/low load zone including governing zone (for example, when a vehicle is travelling on a down hill after passing through the top of the hill), as shown by shade lines in FIG. 5. A high idle operating zone is between 4000 and 4600 rpm with direct injection and between 5000 and 5400 rpm with indirect injection.

This is due to the fact that fuel is injected by a throttle action before the passage has completely been closed (pre-flow effect) or fuel continues to be injected while the valve is being opened (after-flow effect) even if the period during which the solenoid valve is completely closed (the valve is fully lifted) is substantially zero in response to an increase in the speed of rotation of the pump. It is clear that such a pre-flow effect or an after-flow effect often occurs when an engine is rotated at a higher speed, when a cam is operable to supply a greater amount of fuel, and when fuel is injected directly into engine cylinders. Under such a condition, high idle or high speed operation can not be carried out if a zone in which a small amount of fuel is injected is overlapped with a zone in which a constant amount of fuel can not be injected. This presents a serious problem in that ninety persent of vehicle operation is an idle operation.

In order to inject a small amount of fuel at a high idle zone, the solenoid is energized in a manner to open the valve before it is fully lifted as shown in FIG. 4B, taking into account a delay in the response of the valve. In such a way, the valve, say, "floats", and fuel is injected in a rather inconsistent manner. This adversely affects a cycle of fuel injection. Therefore, it is not practical.

It is an object of the present invention to overcome the foregoing problems and to provide a method for controlling the flow rate of fuel in a distributor-type electronic control fuel-injection pump, which is capable of constantly delivering a small amount of fuel during high speed operation or at high idle operating or other zones, and which is effective for a high speed-direct injection system.

DISCLOSURE OF THE INVENTION

In order to achieve the foregoing object, the present invention takes into account of a certain zone which is conventionally not in use. Such a zone is used as a high idle zone where a delay in the timing of fuel injection is most serious. In this way, no delay occurs since the cam is not lifted (zero cam speed) at its one side, and the flow rate of fuel is constantly controlled.

In summary, in an fuel-injection pump including a signal plunger rotated in connection with rotation of an engine and reciprocatingly moved by a cam, a high pressure chamber extending axially of the plunger, the plunger being operable to pressurize fuel in thed high pressure chamber so as to distribute the fuel under pressure to each engine cylinder, a low pressure chamber communicated with the high pressure chamber through a spill passage, a single solenoid valve operable to open and close the spill passage in a manner to control the timing of initiating and terminating fuel delivery, and a timer operable to change the position of the cam as lifted when the fuel delivery is initiated, the present invention provides a method for varying the flow rate of fuel comprising the steps of:

a) operating the cam under four different modes, the modes including a low idle or low speed/low load zone (hereinafter referred to as a low idle zone), a middle load zone, a high load zone, and a governing or high idle zone (hereinafter referred to as a high idle zone);

b) providing the high idle zone between a zero cam speed and a certain cam speed, the high load zone between the time when cam speed is maximum and the time when cam speed is decreased after it has reached the maximum speed, the middle load zone, and the low idle zone in that order as the cam is rotated;

c) fixing either one of a cam speed when the fuel delivery is initiated and a cam speed when the fuel delivery is terminated at the high load zone, the middle load zone and the low idle zone, and controlling the period of the fuel deliver by the solenoid valve so as to inject the necessary amount of fuel; and d) closing the solenoid valve before the cam is lifted and opening the solenoid valve only when the fuel delivery is terminated so as to control the fuel delivery between the time when the can is not lifted and the time when the valve is opened.

Such a method eliminates inoperative condition at high idle zone due to pre-flow or after-flow and ensures that a small amount of fuel is constantly injected during high speed operation.

BRIEF DESCRIPTION OF THE DRAWINGS

FIGS. 1A and 1B are graphs showing the characteristics of a cam for use in the present invention;

FIG. 2A is an enlarged view, in part, of the pump shown in FIG. 2;

FIGS. 4A and 4B are graphs showing the characteristics of a lifted valve in the prior art fuel-injection pump; and FIG. 5 is a graph showing the amount of fuel injected at a high idle operating zone with the prior art fuel-injection pump.

BEST MODE FOR CARRYING OUT THE INVENTION

The present invention will now be described by way of example with reference to the accompanying drawings.

Figure 2:
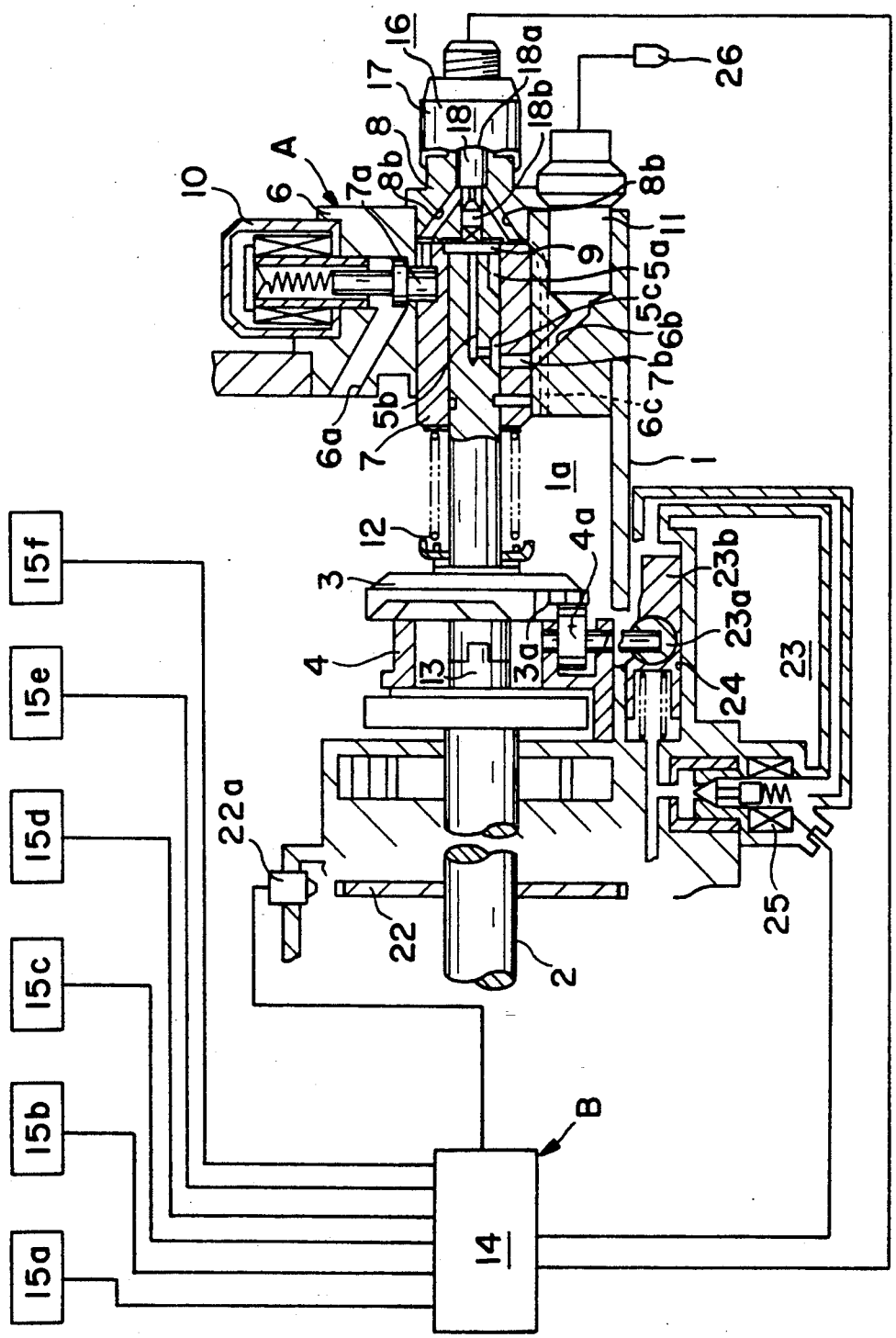
FIG. 2 is a side view, partly broken away, of a fuel-injection pump for use in the present invention.
Figure 3:
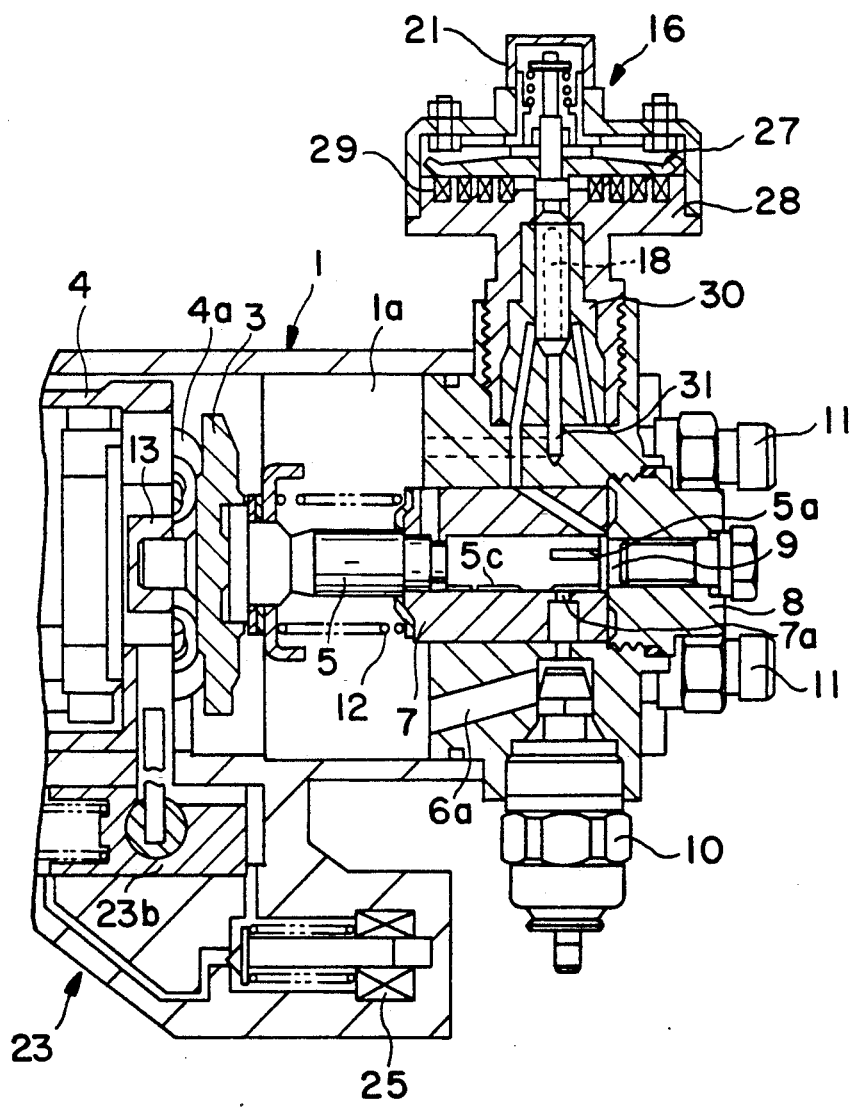
FIG. 3 is a sectional view, in part, of another embodiment of the fuel-injection pump for use in the present invention.

FIGS. 2, 2A, and 3 illustrate a distributor-type electronic control fuel-injection pump for use in connection with the present invention. FIGS. 1A and 1B show cam profile and the characteristics of a cam.

With reference to FIG. 2, A is a fuel-injection pump body. B is an electronic control system. The electronic control system B comprises a control unit 14 including a micro-computer, and a variety of sensors such as a load sensor 15a, a speed sensor 15b, a needle lift sensor 15c, a fuel temperature sensor 15d, ignition sensor 15e, and an airflow sensor 15f. The control unit 14 is operable to receive signals from these sensors, process, and output control signals to a solenoid valve and other components as will later be described.

The fuel-injection pump body A has a housing 1 into which a drive shaft centrally extends to receive a torque from an engine (not shown). The right end of the drive shaft 2 extends into a cam chamber 1a which is surrounded by the housing 1 and a distributor head 6. A barrel 7 is fit into the distributor head 6. A plunger 5 is slidably inserted into the barrel 7 and has a left end extending into the cam chamber 1a.

The plunger 5 has a base portion assembled to a cam disk 3 by a press-fit pin and rotatable therewith. The cam disk 3 is located within the cam chamber 1a. The plunger 5 is urged in a direction away from the distributor head by of a plurality of springs 12. The cam disk 3 is coupled to the drive shaft 2 through a cross coupling 13 so that rotation of the drive shaft 2 may be transmitted to the cam disk 3, and the cam disk 3 is axially movable relative thereto. A plurality of rollers 4a are mounted to a roller holder 4. The lower surface of the cam disk 3 is held in contact with the rollers 4a so as to allow the plunger 5 to reciprocate by a return force of the springs 12. Cam surfaces 3a projects from the lower surface of the cam disk 3 in a circumferentially equally spaced relationship. The number of the cam surfaces 3a is equal to that of engine cylinders. The profile of these cam surfaces 3a determines axial displacement of the plunger.

In the present invention, such a cam profile provides cam speed characteristics as shown in FIGS. 1A and 1B. The one shown in FIG. 1A is suitable for use in a direct injection system. When the cam is lifted (positive cam speed), a series of zones are created, a variable high speed zone where cam speed is increasing from zero (0) (when the cam is not lifted) to a maximum speed Vmax at which the cam is rotated at an angle of $\theta_1$, a speed decreasing zone where cam speed is relatively slowly decreasing from the maximum speed Vmax to a speed $V_1$ at which the cam is rotated at a transitional angle of $\theta_2$, and another speed decreasing zone where cam speed is rapidly decreasing from the speed $V_1$ at which the cam is rotated at a transitional angle of $\theta_2$ to zero at which the cam is rotated at a maximum angle of $\theta_3$.

The characteristics shown in FIG. 1B is suitable for use in an indirect injection system (Fuel is injected into a precombustion chamber). In this instance, zones (positive cam speed) includes a variable speed zone between a zero cam speed and a cam speed $V_2$ ($V_2 < V_1$) at which the cam is rotated at an angle of $\theta$ a, a constant low speed zone where cam angle is changed from the cam angle $\theta$ a to a cam angle $\theta$ b, a speed increasing zone between the cam angle $\theta$ b and a cam angle $\theta_1$ at which cam speed Vmax is maximum, a speed decreasing zone where cam speed is relatively slowly decreasing from the maximum speed Vmax to the cam speed $V_1$ at which the cam is rotated at a transitional angle of $\theta_2$, and another speed decreasing zone where cam speed is changed faster than in the previous speed decreasing zone, from the cam speed $V_1$ to zero.

At the front (right) end of the plunger 5, a head plug 8 is fixed to the distributor head 6 and cooperates with the barrel 7 to define a variable volume high pressure chamber 9. Inlet slits 5a are formed at the front end of the plunger 5 and are equal in number to the engine cylinders. The inlet slits 5a can be brought into registration with a single inlet port 7a of the barrel 7 during downward movement of the plunger so as to allow fuel in the cam chamber 1a to enter into the high pressure chamber 9 and an axially extending passage 5b through an inlet passage 6a. An electrovalve 10 is mounted to the inlet passage 6a to inhibit fuel delivery and is operable by a key switch.

A single outlet slit 5c is formed in the mid-portion of the plunger 5 and branched from the axial passage 5b. When the plunger 5 is moved to bring the outlet slits 5b into registration with each outlet port 7b of the barrel 7 during a discharge cycle, fuel pressurized in the high pressure chamber 9 is forced out through a discharge passage 6b and fed to an injection nozzle 26 via a delivery valve 11 for injection of the fuel into an engine combustion chamber.

A distributor-type fuel-injection pump normally has a control sleeve fit around a plunger within a cam chamber so as to controllably stop fuel delivery. However, the present invention provides no such control sleeve. Instead, a spill passage provides a connection between the high pressure chamber 9 and the cam chamber 1a. The solenoid valve 16 is mounted thereto and is opened and closed to initiate and stop fuel delivery in a controllable fashion.

In the embodiment shown in FIGS. 2 and 2A, the spill passage and the solenoid valve 16 are situated in the head plug 8. In another embodiment shown in FIG. 3, a distributor head includes a spill passage 31 and the solenoid valve 16 at a position substantially opposite to the electrovalve 10.

With reference to FIG. 3, the solenoid valve 16 has a known structure. Specifically, the solenoid valve 16 includes a disk-like armature 27, a stator 28 placed in confronting relation to the armature 27, and a magnetic coil wound in concentric relation to the stator 28. A valve 18 is coupled to the armature 27 and adapted to contact with and separate from a valve seat 30 in which the spill passage is formed. In this case, the solenoid valve 16 is normally kept open. When the magnetic coil 29 is energized, the armature 27 is moved down under the action of a spring 21 so as to pull the valve 18 onto the valve seat 30 to close the spill passage 31.

With reference to FIGS. 2 and 2A, the solenoid valve 16 includes a unit casing 17 having a housing 17c within which a magnetic coil 17a and a fixed core 17b are contained, and a poppet valve 18 inserted into a stepped through hole 8a in the head plug 8.

The poppet valve 18 is composed of two parts, a cylindrical block 18a and a rod-like valve body 18a. The cylindrical block 18a has an axially extending passage 181 in communication with a return spring chamber 170 which is, in turn, formed in the fixed core 17b. The axial passage 181 is partly formed with a female thread 188. The valve body 18b has a thread at its rear end. The female thread 188 is threadably engaged with the thread of the valve body 18b to integrate the cylindrical block 18a and the rod-like valve body 18b together. The cylindrical block 18a is fit in the through hole 8a where its diameter is maximized. A return spring 21 is disposed between the block 18a and the fixed core 17b so as to urge the block in such a direction as to open the valve. A gap $\Delta$ is formed between the fixed core 17b and the cylindrical block 18a and is adjustable by changing a length L of the cylindrical block 18a.

The valve body 18b has a head 180 at its one end. The head 180 is oriented toward the high pressure chamber 9 and is engageable with a seat portion 189 which is formed at the peripheral edge of the open end of the stepped through hole 8a. Behind the head 180 are formed a first small diameter portion 182 and a second small diameter portion 184 spaced a certain distance from the first small diameter portion 182. Holes 185 and 186 are formed in the first and second small diameter portions 182 and 184 to act as a spill passage and extend in a direction at right angles to the axis of the valve. These holes 185 and 186 are communicated with the spring chamber 170 through an axially extending main passage 187. A step is formed between the second small diameter portion 184 and one end of the thread. A shim 19 is fit around the step to contact with an end surface of the cylindrical block 18a. The thickness of the shim 19 is selectively changed to control the amount H of lifting of the valve 18 (H $<\Delta$).

The head plug 8 has several return ports 8b as a main part of the spill passage. Each return port 8b extends from the mid-portion of the through hole 8a where the second small diameter portion 184 is located to an end surface of the head plug 8 outwardly of a edge seal 18e. The return ports 8b are communicated with the cam chamber 1a through the head return port 6c of the distributor head 6. If the volume of the head return port 6c is less than necessary, a barrel return port 7c may be formed to communicate with the inlet port 7a of the barrel 7.

The solenoid valves 16 shown in FIGS. 2 and 3 are normally open and actuated when the magnetic coils 17a and 29 are energized in response to a signal from the control unit 14. To this end, a sensing gear 22 is fit around the drive shaft 2 and has projections as shown in FIG. 2. The number of the projections is equal to the number of the engine cylinders. A pickup 22 is operable to sense reference position pulses to control the valve.

A hydraulic timer 23 is connected through an operating rod 23a to the roller holder 4 so as to control the timing of fuel injection, that is, to adjust the position to which the cam is lifted (pre-lift) when the fuel delivery is initiated. For the purpose of explanation, the hydraulic timer 23 is shown as being opened at ninety degrees. This hydraulic timer 23 is identical in structure to a conventional timer. A timer piston 23 is located within a cylinder chamber 24 which is, in turn, communicated at its right and left sides with the fuel-injection pump and the cam chamber. A solenoid-operated timing control valve 25 is operable to control pressure in the cylinder chamber 24 so as to position the timer piston 23. This controls angular position of the roller holder 4 which is adapted to move the cam disk 3 in an axial direction. The control unit 14 is operable to analyze the input information from the sensor and control the solenoid-operated timing control valve 25.

With the distributor-type electronic control fuel-injection pump thus described, the present invention provides a method for varying the flow rate of fuel as follows. In FIGS. 1A and 1B, the cam is operated under the following modes.

I . . . low idle zone
II . . . middle load zone
III . . . high load zone
IV . . . high idle zone Generally, the flow rate of fuel is low at the low idle zone, medium at the middle zone, high at the high load zone, and low at the high idle zone. It is preferable that the flow rate at the high idle zone is equal to or higher than that at the low idle load.

With reference to FIGS. 1A and 1B wherein graphs show cam characteristics, as the cam is rotated, a mode of operation begines with the high idle zone IV, followed by the high load zone III and the middle load zone II, and ends with the low idle zone I. Specifically, the high idle zone IV is a range (0 to D) between the time when the cam is not yet lifted and the time when lifting of the cam is just initiated. This range can be the variable speed zone as shown in FIG. 1A, or can be a combination of the variable speed zone and the constant low speed zone as shown in FIG. 1B. The high load zone III is a range (C' to C) including part of the speed increasing zone near the maximum cam speed point Vmax and the biginning part of the speed decreasing zone where the cam speed slowly decreases. The middle load zone II is either a range (B' to B) including the speed decreasing zone until the cam speed is decreased to the speed $V_1$ where the cam is rotated at an angle of $\theta_2$ or a range (B' to B) including the speed decreasing zone until the cam speed is decreased to the speed $V_1$ where the cam is rotated at an angle of $\theta_2$ and the biginning part of the speed decreasing zone where the cam speed rapidly decreases. Finally, the low idle zone I is a range (A' to A) or part of the speed decreasing zone where the cam speed rapidly decreases and preferably, where the cam is rotated near to the maximum extent $\theta_3$.

Under such a condition, when the engine is driven, signals are sent from the sensors 15a to 15f and the sensing gear 22 to the control unit 14. The control unit 14 is then operable to arithmetically calculate an optimum mount of fuel to be injected and send drive signals to the fuel delivery stop electromagnet valve 10, the solenoid valve 16 and the solenoid-operated timing control valve 25, respectively.

When the drive shaft 2 is driven for rotation by the engine, the cam disk 3 is rotated while it is pressed by the roller 4a. This causes reciprocating motion of the plunger 5. Fuel flows from the cam chamber 1 to the high pressure chamber 9 through the inlet slits 5a and the inlet port 7a when the plunger 5 is retracted.

Since the solenoid valve 16 is normally open, fuel is split. With reference specifically to FIG. 3, the spill passage 31 is opened to provide a communication between the high pressure chamber 9 and the cam chamber 1a so as to spill the fuel. In the case shown in FIGS. 2 and 2A, fuel flows from the high pressure chamber 9 to the cam chamber 1a through the hole 185, the main passage 186, the return port 8b, and the head return port 6c. At this time, the fuel flows through the axial passage 181 to fill the return spring chamber. Then, pressure in the upstream of the valve becomes equal to that in the downstream of the valve, and the valve is held in open under the action of the return spring 21.

Now, the electromagnet valve 17a is energized so as to attaract the poppet valve 18 as a movable core in FIGS. 2 and 2A. This pulls the head 180 onto the seat portion 189 of the stepped through hole 8a so as to close the through hole 8a. The high pressure chamber 9 and the cam chamber 1a are no longer communicated with one another. As a result, pressure in the high pressure chamber 9 increases with lifting of the plunger 5. Fuel is then ready for delivery.

When the valve body 18b is lifted to close the valve, the plunger 5 is also being lifted. Throttling action of the head 180 results in a considerable difference in pressure. This difference in pressure and a magnetic force causes the valve body 18b to be rapidly opened. Then, the valve body 18b is closed under pressure in the high pressure chamber 9 to provide a proper seal.

As is clear from the above, the solenoid valve 16 is energized and deenergized so as to initiate and stop fuel delivery (the amount of fuel injected and the timing of injection). In other words, unless the magnetic coil 17a is energized, the valve body 18b is kept open when the plunger 5 is moved for introduction of fuel into the high pressure chamber. Pressure in the high pressure chamber 9 in no way increases since fuel in the high pressure chamber 8 enters into the cam chamber 1 in a manner as explained earlier. No fuel delivery takes place. When the magnetic coil 17a is energized, then the valve body 18b is closed to seal the high pressure chamber 9. This results in an immediate increase in pressure of fuel so as to initiate fuel delivery. When the magnetic coil 17a is again energized after a predetermined period of time, then the fuel is split from the high pressure chamber 9 and enters into the cam chamber 1a. This terminates fuel delivery. The solenoid valve 16 may be closed in response to reference pulses from the sensing gear 22.

According to the present invention, the solenoid valve 16 is operated in the four different modes. Specifically, the cam speed positions A', B' and C' when fuel delivery is initiated are fixed at the low idle zone I, the middle load zone II, and the high load zone III. In these modes, the solenoid valve 16 is opened and closed to control the period of fuel delivery according to the necessary amount of fuel to be injected. For example, if the cam speed positions A, B and C when fuel delivery is terminated are fixed, the solenoid valve is energized to close the valve at the cam speed positions A', B' and C' or when the cam is further rotated from these points, and is then, deenergized to open the valve at the cam speed positions A, B and C.

As shown in FIGS. 1A and 1B, the cam speed is zero at one side of the high idle zone IV. To this end, the solenoid valve 16 is operable only when fuel delivery is terminated. Specifically, in the high idle zone IV, the magnetic coil 17a is energized to close the valve body 18b before the cam is lifted. Then, the high pressure chamber 9 and the cam chamber 1a are no longer communicated with one another so as to allow fuel delivery. The cam is lifted under the circumstances. Then, the plunger is lifted so as to increase fuel pressure. When the sensing gear 22 senses that the cam is rotated by a desired amount, the control unit 14 provides a signal to deenergize the magnetic coil 17a. The valve body 18b is then opened to cause fuel to flow from the high pressure chamber 9. This terminates fuel delivery.

As stated above, there is a lag in the solenoid valve between the time when the magnetic coil 17a is energized and the time when the valve body 18b is mechanically moved. Thus, if energized to open the valve while the cam is being rotated, the pre-flow or after-flow is inevitable. In the present invention, the valve body 18b is closed when the cam speed is zero or before the cam is lifted. This eliminates a delay in the response. The period of fuel delivery can accurately be controlled by changing the cam speed position D in FIGS. 1A and 1B. In other words, the cam speed position D is a position where fuel delivery is terminated at the high idle zone IV. The amount of fuel injected can be reduced to a minimum extent if the solenoid valve 16 is energized so as to move the cam speed position D toward zero when the cam is rotated by a small amount. In this case, since the valve is of a normally open type, pressure of fuel in the high pressure chamber is decreased immediately after the valve is opened. The valve is properly responded when the fuel delivery is terminated. Therefore, a small amount of fuel is constantly injected at the governing or high idle zone.

INDUSTRIAL APPLICABLITY

The present invention is suitable for controlling the flow rate of fuel in a distributor-type fuel-injection pump in connection with a high speed, direct injection system.

What is claimed is:

1. In an fuel-injection pump including a signal plunger rotated in connection with rotation of an engine and reciprocatingly moved by a cam, a high pressure chamber extending axially of said plunger, said plunger being operable to pressurize fuel in said high pressure chamber so as to distribute the fuel under pressure to each engine cylinder, a low pressure chamber communicated with said high pressure chamber through a spill passage, a single solenoid valve operable to open and close the spill passage in a manner to control the timing of initiating and terminating fuel delivery, and a timer operable to change the position of the cam as lifted when the fuel delivery is initiated, a method for varying the flow rate of fuel comprising the steps of:
   a) operating said cam under four different modes, said modes including a low idle or low speed/low load zone I, a middle load zone II, a high load zone III, and a governing or high idle zone IV;
   b) providing said governing or high idle zone IV between a zero cam speed and a certain cam speed, said high load zone III between the time when cam speed is maximum and the time when cam speed is decreased after it has reached the maximum speed, said middle load zone II, and said low idle or low speed/low load zone I in that order as said cam is rotated;
   c) fixing either one of a cam speed when the fuel delivery is initiated and a cam speed when the fuel delivery is terminated at said high load zone III, said middle load zone II and said low idle or low speed/low load zone I, and controlling the period of the fuel delivery by said solenoid valve so as to inject the necessary amount of fuel; and
   d) closing said solenoid valve before said cam is lifted and opening said solenoid valve only when the fuel delivery is terminated so as to control the fuel delivery between the time when said cam is not lifted and the time when said valve is opened.

2. A method for varying the flow rate of fuel in a distributor-type electronic control fuel-injection pump as claimed in claim 1, wherein said solenoid valve is an electrovalve of the type which is normally open.

3. A method for varying the flow rate of fuel in a distributor-type electronic control fuel-injection pump as claimed in claim 1, wherein the flow rate of fuel is generally low in said low idle or low speed/low load zone I, medium in the middle load zone II, high in the high load zone III, and low in said governing or high idle zone IV.

4. A method for varying the flow rate of fuel in a distributor-type electronic control fuel-injection pump as claimed in claim 1, wherein when said cam is lifted, cam characteristics includes a variable high speed zone where cam speed is increasing from zero 0 to a maximum speed Vmax, a speed decreasing zone where cam speed is relatively slowly decreasing from the maximum speed Vmax to a cam speed $V_1$ at which said cam is rotated at a transitional angle of $\theta_2$, and another speed decreasing zone where cam speed is rapidly decreasing from said cam speed $V_1$ at which said cam is rotated at a transitional angle of $\theta_2$, and wherein said governing or high idle zone IV is a range (0 to D) between the time when the cam is not yet lifted and the beginning part of said variable high speed zone, said high load zone III is a range (C' to C) from said variable high speed zone to the beginning part of said speed decreasing zone where speed is relatively slowly decreasing from the maximum cam speed Vmax, said middle load zone II is a range (B' to B) between part of said variable speed decreasing zone where cam speed is relatively slowly decreasing and the end thereof or the beginning part of said variable speed decreasing zone where cam speed is rapidly decreasing, and said low idle or low speed/low load zone I is a range (A' to A) including part of said variable speed increasing zone where cam speed is rapidly decreasing.

5. A method for varying the flow rate of fuel in a distributor-type electronic control fuel-injection pump as claimed in claim 1, wherein cam characteristics includes a variable speed zone between the time when said cam is not lifted and the time when said cam is rotated at an angle of $\theta$ a, a constant low speed zone where cam angle is changed from said angle $\theta$ a to an angle $\theta$ b, a speed increasing zone between said cam angle $\theta$ b and a cam angle at which said cam speed Vmax is maximum, a speed decreasing zone where cam speed is relatively slowly decreasing from the maximum speed Vmax to said cam speed $V_1$ at which said cam is rotated at a transitional angle of $\theta_2$ and another speed decreasing zone where cam speed is rapidly decreasing from said cam speed $V_1$ at which said cam is rotated at a transitional angle of $\theta_2$ and wherein said governing or high idle zone IV is a range (0 to D) including the time when the cam speed is zero and said constant low speed zone, said high load zone III is a range (C' to C) from said variable high speed zone to the beginning part of said speed decreasing zone where cam speed is relatively slowly decreasing from the maximum speed Vmax, said middle load zone II is a range (B' to B) between part of said variable speed decreasing zone where cam speed is relatively slowly decreasing and the end thereof or the beginning part of said variable speed decreasing zone where cam speed is rapidly decreasing, and said low idle or low speed/low load zone I is a range (A' to A) including part of said variable speed increasing zone where cam speed is rapidly decreasing.

6. A method for varying the flow rate of fuel in a distributor-type electronic control fuel-injection pump as claimed in claim 1, wherein said solenoid valve is mounted to a head plug and includes a poppet valve.

7. A method for varying the flow rate of fuel in a distributor-type electronic control fuel-injection pump as claimed in claim 1, wherein said solenoid valve is mounted to a distributor head.

* * * * *

UNITED STATES PATENT AND TRADEMARK OFFICE
CERTIFICATE OF CORRECTION

PATENT NO. : 5,115,783
DATED : May 26, 1992
INVENTOR(S) : Nakamura et al It is certified that error appears in the above-identified patent and that said Letters Patent is hereby corrected as shown below:

On the title page, insert the following between items [21] and [51]:

-- [22] PCT Filed: Dec. 19, 1990
   [86] PCT No.: PCT/JP90/01205
       § 371 Date: Dec. 19, 1990
       § 102(e) Date: Dec. 19, 1990
   [87] PCT Pub. No.: WO91/04398
       PCT Pub. Date: Apr. 4, 1991

[30] Foreign Application Priority Data
     Sept. 22, 1989 [JP] Japan ........... 1-244912 --.

Signed and Sealed this

Seventh Day of September, 1993

*Attest:*

*Attesting Officer*

BRUCE LEHMAN
*Commissioner of Patents and Trademarks*

UNITED STATES PATENT AND TRADEMARK OFFICE
CERTIFICATE OF CORRECTION

PATENT NO. : 5,115,783
DATED : May 26, 1992
INVENTOR(S) : Nakamura et al.

It is certified that error appears in the above-identified patent and that said Letters Patent is hereby corrected as shown below:

On the title page, in item [22] the date should be September 20, 1990, so that said item [22] should read as follows:

--[22]    PCT Filed:    September 20, 1990--

Signed and Sealed this

Twenty-sixth Day of April, 1994

Attest:

BRUCE LEHMAN

*Attesting Officer*                *Commissioner of Patents and Trademarks*